United States Patent
Shimizu

(10) Patent No.: US 11,372,925 B2
(45) Date of Patent: Jun. 28, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Tomoyuki Shimizu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 201 days.

(21) Appl. No.: 16/503,627

(22) Filed: Jul. 5, 2019

(65) Prior Publication Data

US 2020/0301975 A1    Sep. 24, 2020

(30) Foreign Application Priority Data

Mar. 19, 2019   (JP) .............. JP2019-051940

(51) Int. Cl.
| | | |
|---|---|---|
| *G06F 16/9032* | (2019.01) | |
| *G06F 16/248* | (2019.01) | |
| *G06F 16/2457* | (2019.01) | |
| *G06F 16/93* | (2019.01) | |

(52) U.S. Cl.
CPC ...... *G06F 16/90328* (2019.01); *G06F 16/248* (2019.01); *G06F 16/24578* (2019.01); *G06F 16/93* (2019.01)

(58) Field of Classification Search
CPC ............. G06F 16/907; G06F 16/24578; G06F 16/90328; G06F 16/248; G06F 16/93
USPC .......................................... 707/728
See application file for complete search history.

(56) References Cited

U.S. PATENT DOCUMENTS

| | | | |
|---|---|---|---|
| 2002/0156763 A1* | 10/2002 | Marchisio | G06F 16/30 |
| 2007/0192318 A1* | 8/2007 | Ramer | G06F 16/9535 |
| 2008/0147653 A1* | 6/2008 | Collier | G06F 16/951 |
| 2011/0016118 A1* | 1/2011 | Edala | G06F 16/951 707/730 |

FOREIGN PATENT DOCUMENTS

JP          2015106354         6/2015

* cited by examiner

*Primary Examiner* — Kuen S Lu
(74) *Attorney, Agent, or Firm* — JCIPRNET

(57) ABSTRACT

An information processing apparatus includes an acquisition unit that acquires a text being input, and an output unit that, when search information for searching for target information is created or updated, from suggestion information created or updated by being extracted from the target information or the search information, extracts the suggestion information corresponding to the text acquired by the acquisition unit, and outputs display information for displaying the extracted suggestion information with a suggestion content predetermined for each operation authority of a user.

20 Claims, 18 Drawing Sheets

FIG. 4

```
☐ DOCUMENT A MEMO PAD                    _ ☐ ×
FILE(F)  EDIT(E)  FORM(O)  DISPLAY(Y)  HELP(H)
I AM A CAT. I DO NOT HAVE A NAME YET.
```

⬇

| DOCUMENT ID | SEARCH INFORMATION (IN THIS EXAMPLE, DOCUMENT CONTENT) | SUGGESTION INFORMATION (IN THIS EXAMPLE, NOUN) |
|---|---|---|
| DOCUMENT A | I AM A CAT. I DO NOT HAVE A NAME YET. | ·I<br>·CAT<br>·NAME |

FIG. 5

| SUGGESTION INFORMATION | WEIGHT |
|---|---|
| MACHINE LEARNING | 3 |
| MACHINE TYPE | 2 |
| MACHINE | 1 |

FIG. 6

| DOCUMENT ID | SEARCH INFORMATION (IN THIS EXAMPLE, DOCUMENT NAME) | SUGGESTION INFORMATION (IN THIS EXAMPLE, DOCUMENT NAME ITSELF) | WEIGHT (IN THIS EXAMPLE, LENGTH OF DOCUMENT NAME) |
|---|---|---|---|
| DOCUMENT A | MACHINE SPECIFICATION DOCUMENT.docx | MACHINE SPECIFICATION DOCUMENT.docx | 35 |
| DOCUMENT B | MACHINE LEARNING.pptx | MACHINE LEARNING.pptx | 21 |
| DOCUMENT C | MACHINE MANAGEMENT REGISTER_2018.xlsx | MACHINE MANAGEMENT REGISTER_2018.xlsx | 37 |

⬇ PRESENTATION OF SUGGESTION CANDIDATE

40

| MACHINE 🔍 |
|---|
| MACHINE MANAGEMENT REGISTER_2018.xlsx |
| MACHINE SPECIFICATION DOCUMENT.docx |
| MACHINE LEARNING.pptx |

FIG. 8

| DOCUMENT ID | SEARCH INFORMATION (IN THIS EXAMPLE, DOCUMENT NAME) | SUGGESTION INFORMATION (IN THIS EXAMPLE, DOCUMENT NAME ITSELF) | ACCESS AUTHORITY ID |
|---|---|---|---|
| DOCUMENT A | MACHINE MANAGEMENT.xlsx | MACHINE MANAGEMENT.xlsx | 1 |
| DOCUMENT B | MACHINE LEARNING.pptx | MACHINE LEARNING.pptx | 1 |
| DOCUMENT C | MACHINE PROJECT.docx | MACHINE PROJECT.docx | 2 |
| DOCUMENT D | MACHINE DOCUMENT.xdw | MACHINE DOCUMENT.xdw | 2 |

| ACCESS AUTHORITY ID | MAIN SUBJECT (USER/GROUP) | PERMITTED OPERATION |
|---|---|---|
| 1 | USER A | ·READ CONTENT<br>·WRITE CONTENT<br>·SEARCH DISPLAY<br>·WRITE ATTRIBUTE<br>·READ ATTRIBUTE |
| 2 | USER B | ·SEARCH DISPLAY<br>·READ ATTRIBUTE |

IN CASE WHERE USER B INPUTS MACHINE

FIG. 9

| DOCUMENT ID | SUGGESTION INFORMATION (IN THIS EXAMPLE, NOUN WORD IN CONTENT) | ACCESS AUTHORITY ID |
|---|---|---|
| DOCUMENT A | MACHINE MANAGEMENT, ⋯ | 1 |
| DOCUMENT B | MACHINE LEARNING, ⋯ | 1 |
| DOCUMENT C | MACHINE PROJECT, ⋯ | 2 |
| DOCUMENT D | MACHINE DOCUMENT, ⋯ | 2 |

| ACCESS AUTHORITY ID | MAIN SUBJECT (USER/GROUP) | PERMITTED OPERATION |
|---|---|---|
| 1 | USER A | ·READ CONTENT<br>·WRITE CONTENT<br>·CONTENT POSTING |
| 2 | USER B | ·READ CONTENT<br>·WRITE CONTENT<br>·~~CONTENT POSTING~~ |

IN CASE WHERE USER B INPUTS MACHINE

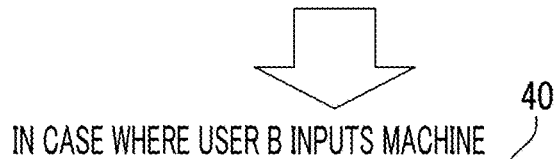

40

MACHINE
MACHINE MANAGEMENT
MACHINE LEARNING
MACHINE PROJECT
MACHINE DOCUMENT

POSTING OPERATION SET TO BE IMPOSSIBLE.

FIG. 10

| DOCUMENT ID | SUGGESTION INFORMATION (IN THIS EXAMPLE, DOCUMENT NAME ITSELF) | ACCESS AUTHORITY ID |
|---|---|---|
| DOCUMENT A | MACHINE MANAGEMENT.xlsx | 1 |
| DOCUMENT B | MACHINE LEARNING.pptx | 1 |
| DOCUMENT C | MACHINE PROJECT.docx | 2 |
| DOCUMENT D | MACHINE DOCUMENT.xdw | 2 |

| ACCESS AUTHORITY ID | MAIN SUBJECT (USER/GROUP) | PERMITTED OPERATION |
|---|---|---|
| 1 | USER A | ·READ CONTENT<br>·WRITE CONTENT<br>·CONTENT POSTING |
| 2 | USER B | ·READ CONTENT<br>·WRITE CONTENT<br>·~~CONTENT POSTING~~ |

IN CASE WHERE USER B INPUTS MACHINE

40

| MACHINE | 🔍 |
|---|---|
| MACHINE MANAGEMENT.xlsx | |
| MACHINE LEARNING.pptx | |
| MACHINE PROJECT.docx | ⊠ ← 42 |
| MACHINE DOCUMENT.xdw | ⊠ ← 42 |

FIG. 11

| SEARCH DISPLAY | READ ATTRIBUTE | READ CONTENT | WRITE ATTRIBUTE | WRITE CONTENT | CONTENT PRINTING | SUGGESTION METHOD |
|---|---|---|---|---|---|---|
| NON-PERMISSION | (ANY) | (ANY) | (ANY) | (ANY) | (ANY) | NOT DISPLAY SUGGESTION |
| PERMISSION | (ANY) | NON-PERMISSION | (ANY) | (ANY) | (ANY) | DISPLAY SUGGESTION IN RED COLOR DISPLAY BUTTON WHICH MEANS [GRANTING READ CONTENT AUTHORITY] |
| PERMISSION | (ANY) | PERMISSION | (ANY) | (ANY) | NON-PERMISSION | DISPLAY ICON WHICH MEANS THAT PRINTING IS IMPOSSIBLE |

FIG. 12
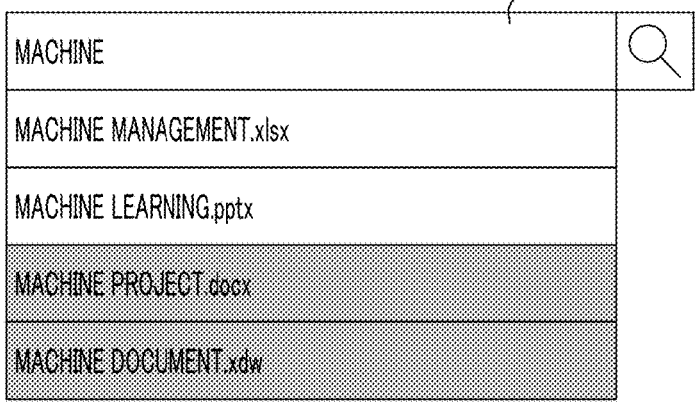
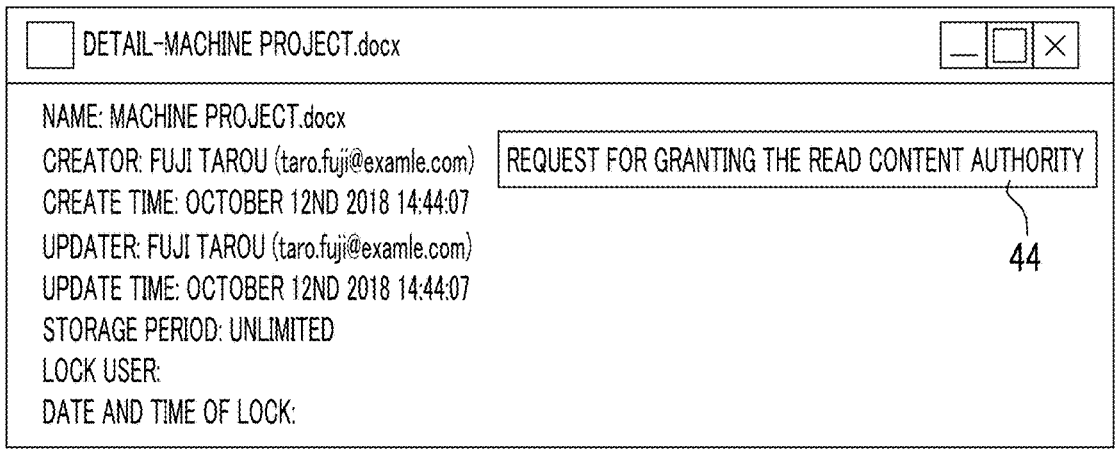

FIG. 13

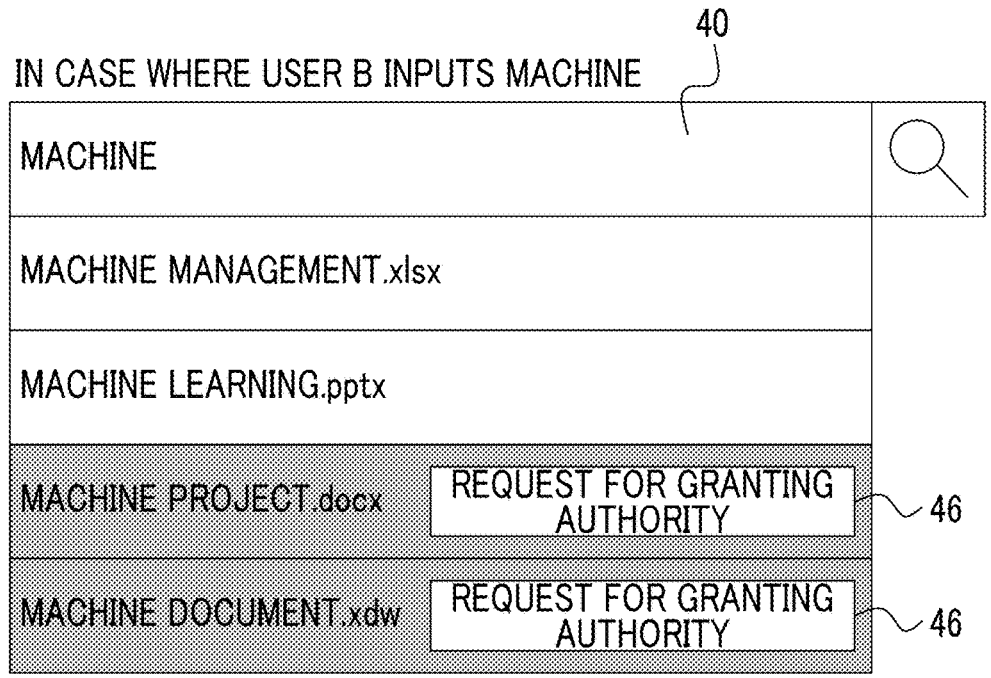

FIG. 14

THIS E-MAIL IS SENT BY ACCESS AUTHORIZATION REQUEST NOTIFICATION FUNCTION OF XX SERVICE. PLEASE NOTE THAT WE CAN NOT ANSWER EVEN IF YOU REPLY.

USER A SENT
REQUEST FOR GRANTING AUTHORITY FOR READING CONTENT
MACHINE PROJECT.docx YOU CAN ACCESS TARGET DOCUMENT WITH FOLLOWING URL.
http://xxxxxx YOU CAN ACCESS SCREEN FOR GRANTING ACCESS AUTHORITY OR REJECTING REQUEST WITH FOLLOWING URL.
http://xxxxxx FUJI XEROX CO., LTD XX SERVICE
http://xxxxxx

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-051940 filed Mar. 19, 2019.

BACKGROUND

(i) Technical Field

The present invention relates to an information processing apparatus, and a non-transitory computer readable medium storing information processing program.

(ii) Related Art

JP2015-106354A discloses a search suggestion device includes a suggestion dictionary storage unit that is connected to a search server and a user terminal through a network and arranges and stores search query candidates in a predetermined order a query receiver that receives input search query and user attributes from the user terminal a suggestion extraction unit that extracts the search query candidates including the search query from the suggestion dictionary storage unit a suggestion selection unit that selects search query candidates from among the extracted search query candidates based on the user attributes and a suggestion transmitter that transmits the selected search query candidates to the user terminal.

SUMMARY

When presenting the suggestion information, whether or not the suggestion information is to be presented or not is decided depending on the availability of browsing by the access authority, but more detailed operation is not enabled by the access authority. Aspects of non-limiting embodiments of the invention relate to an information processing apparatus, and a non-transitory computer readable medium storing information processing program, capable of presenting suggestion information with more flexible suggestion content as compared to a case of presenting suggestion information by deciding whether or not to present the suggestion information according to the availability of the browsing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus that includes an acquisition unit that acquires a text being input, and an output unit that, when search information for searching for target information is created or updated, from suggestion information created or updated by being extracted from the target information or the search information, extracts the suggestion information corresponding to the text acquired by the acquisition unit, and outputs display information for displaying the extracted suggestion information with a suggestion content predetermined for each operation authority of a user.

BRIEF DESCRIPTION OF THE DRAWINGS

Exemplary embodiment(s) of the present invention will be described in detail based on the following figures, wherein:

FIG. 4 is a diagram showing an example of creating a first document content as search information from content of the document;

FIG. 5 is a diagram showing an example in which a weight is assigned to suggestion information;

FIG. 6 is a diagram showing an example of creating one example of the search information, the suggestion information, and the weight when three documents of documents A to C are stored in the document repository as document IDs;

FIG. 8 is a diagram for describing a first example of a presentation method, when presenting the suggestion information by varying the suggestion method according to access authority;

FIG. 9 is a diagram for describing a second example of a presentation method, when presenting the suggestion information by varying the suggestion method according to access authority;

FIG. 10 is a diagram for describing a third example of a presentation method, when presenting the suggestion information by varying the suggestion method according to access authority;

FIG. 11 is a diagram showing an example of a setting screen of the suggestion method;

FIG. 12 is a diagram for describing an example of a method of requesting grant of access authority;

FIG. 13 is a diagram showing a "request for granting an authority" button displayed together with the display of suggestion candidates;

FIG. 14 is a diagram showing an example of content of an e-mail sent to a document creator or the like when a request for granting is operated;

DETAILED DESCRIPTION

Hereinafter, exemplary embodiments of the present invention will be described in detail with reference to the accompanying drawings.

In the embodiment, an information processing system in which a plurality of information processing apparatuses and servers are respectively connected through communication lines such as various networks will be described as an example.

Figure 1:
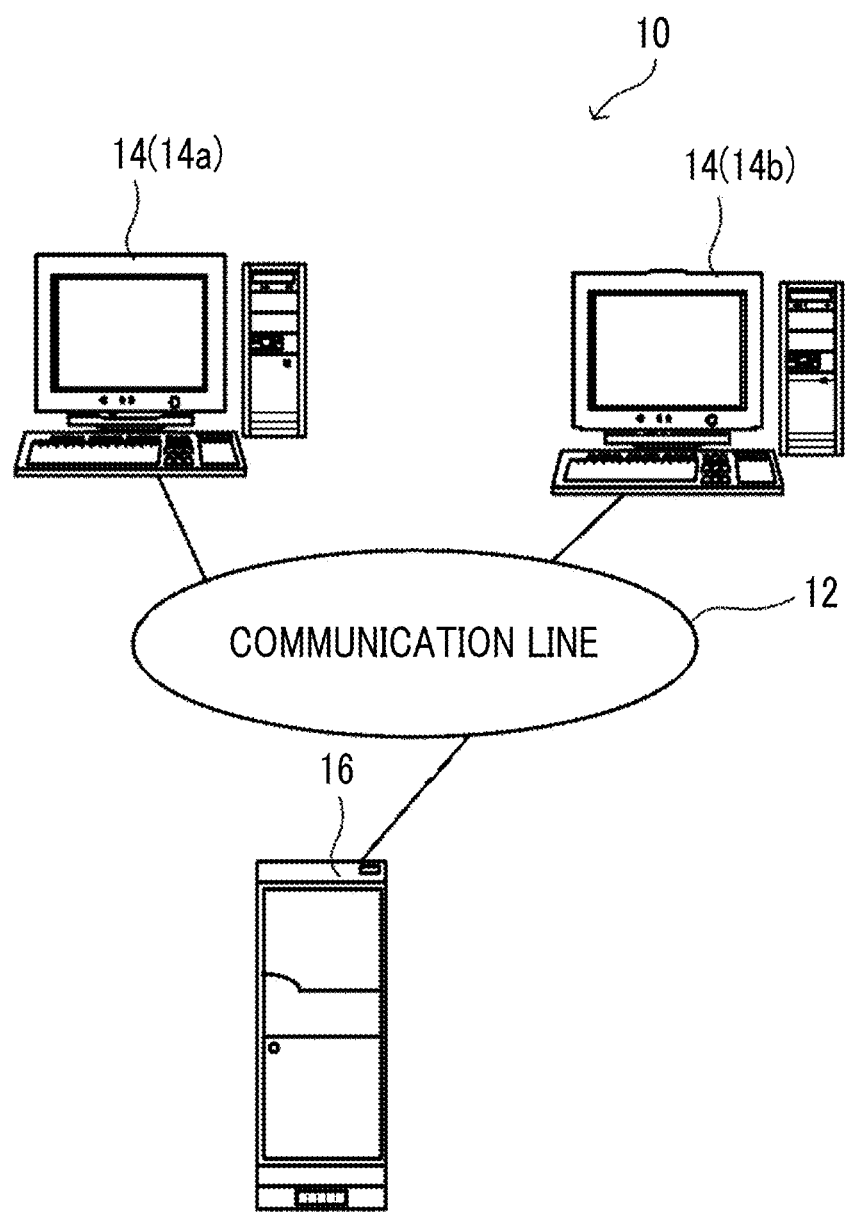
FIG. 1 is a diagram showing a schematic configuration of an information processing system according to an embodiment.

FIG. 1 is a diagram showing a schematic configuration of an information processing system 10 according to the embodiment.

As shown in FIG. 1, the information processing system 10 according to the embodiment includes a plurality of information processing terminals 14a, 14b, and the like and a cloud server 16 as an information processing apparatus. When there is no need to distinguish between the information processing terminals 14a, 14b, and the like the alphabet at the end of the reference numerals may not be described. In the embodiment, an example in which the plurality of information processing terminals 14a, 14b, and the like are provided will be described, but there may be only one information processing terminal 14.

The information processing terminals 14 and the cloud server 16 are connected to each other through communication lines 12 such as a local area network (LAN), a wide area network (WAN), the Internet, and an intranet. Then, each of the information processing terminals 14 and the cloud server may mutually transmit and receive various data through the communication lines 12.

The information processing system 10 according to the embodiment provides a document management service in which, the cloud server 16 manages documents with cloud services. For example, the document management service enables the information processing terminal 14 to access the cloud server 16, store various documents as information in the cloud server 16, or browse the documents stored and managed in the cloud server 16.

Figure 2:
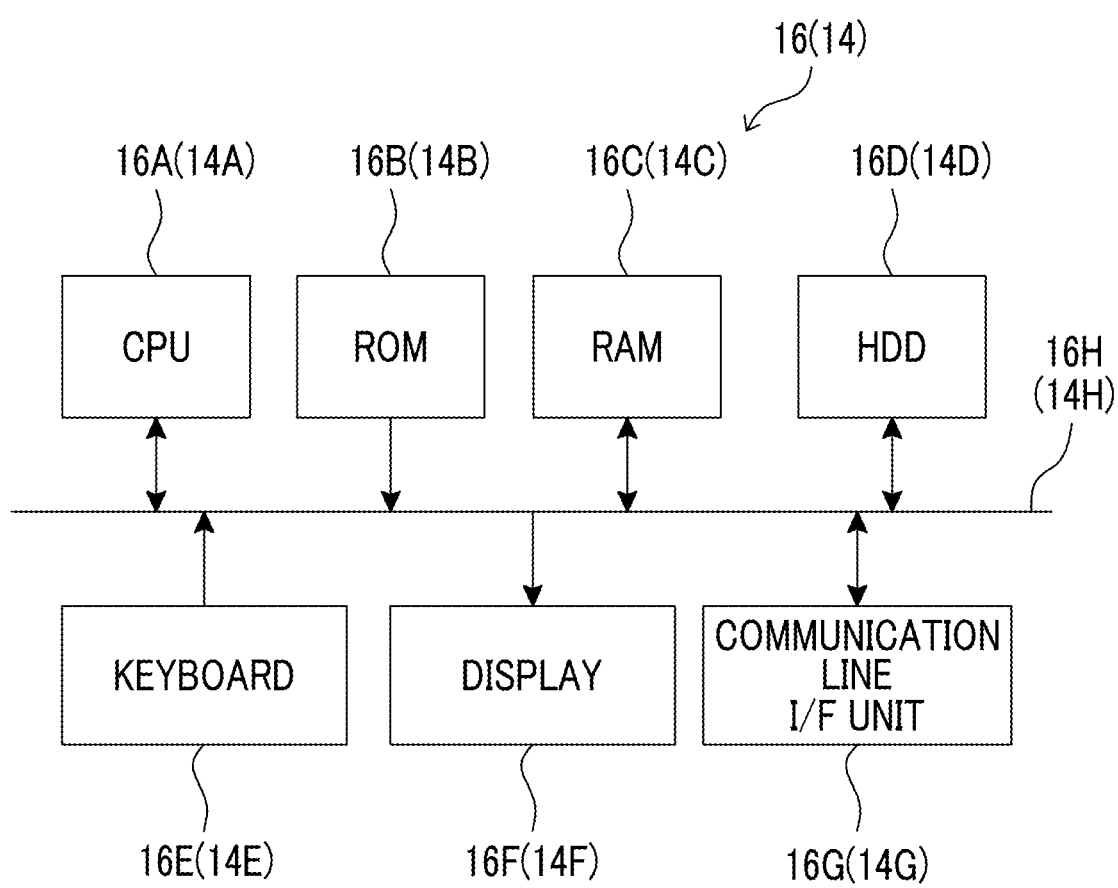
FIG. 2 is a block diagram showing a major configuration of an electrical system of an information processing terminal and a cloud server in the information processing system according to the embodiment.

Then, the major configuration of the electrical system of the information processing terminal 14 and the cloud server 16 according to the embodiment will be described. FIG. 2 is a block diagram showing a major configuration of an electrical system of the information processing terminals 14 and the cloud server 16 in the information processing system 10 according to the embodiment. Since both the information processing terminal 14 and the cloud server 16 basically have a general computer configuration, the information processing terminal 14 will be described as a representative example.

As shown in FIG. 2, the information processing terminal 14 according to the embodiment includes a CPU 14A, a ROM 14B, a RAM 14C, an HDD 14D, a keyboard 14E, a display 14F, and a communication line interface (IF) unit 14G. The CPU 14A manages the entire operation of the information processing terminal 14. Various control programs and various parameters are stored in advance in the ROM 14B. The RAM 14C is used as a work area or the like when the CPU 14A executes various programs. Various data, application programs, and the like are stored in the HDD 14D. The keyboard 14E is used to input various information. The display 14F is used to display various information. The communication line IF unit 14G is connected to the communication line 12 and transmits and receives various data to and from other apparatuses connected to the communication line 12. The components of the information processing terminal 14 described above are electrically connected to each other by a system bus 14H. In the information processing terminal 14 according to the embodiment, the HDD 14D is applied as a storage unit, but not limited thereto, and accordingly, another non-volatile storage unit such as a flash memory may be applied.

With the above configuration, the information processing terminal 14 according to the embodiment performs, by the CPU 14A, access to the ROM 14B, RAM 14C, and HDD 14D, acquisition of various data through the keyboard 14E, and display of various information on the display 14F respectively. In addition, the information processing terminal 14 controls the transmission and reception of communication data through the communication line IF unit 14G by the CPU 14A.

The information processing system 10 according to the embodiment configured as described above provides, as described above, the document management service in which the cloud server 16 manages documents with cloud services. For example, by migrating information stored in the information processing terminal 14 to the cloud server 16 as a document to be managed, the document management by the cloud server 16 is performed.

Figure 3:
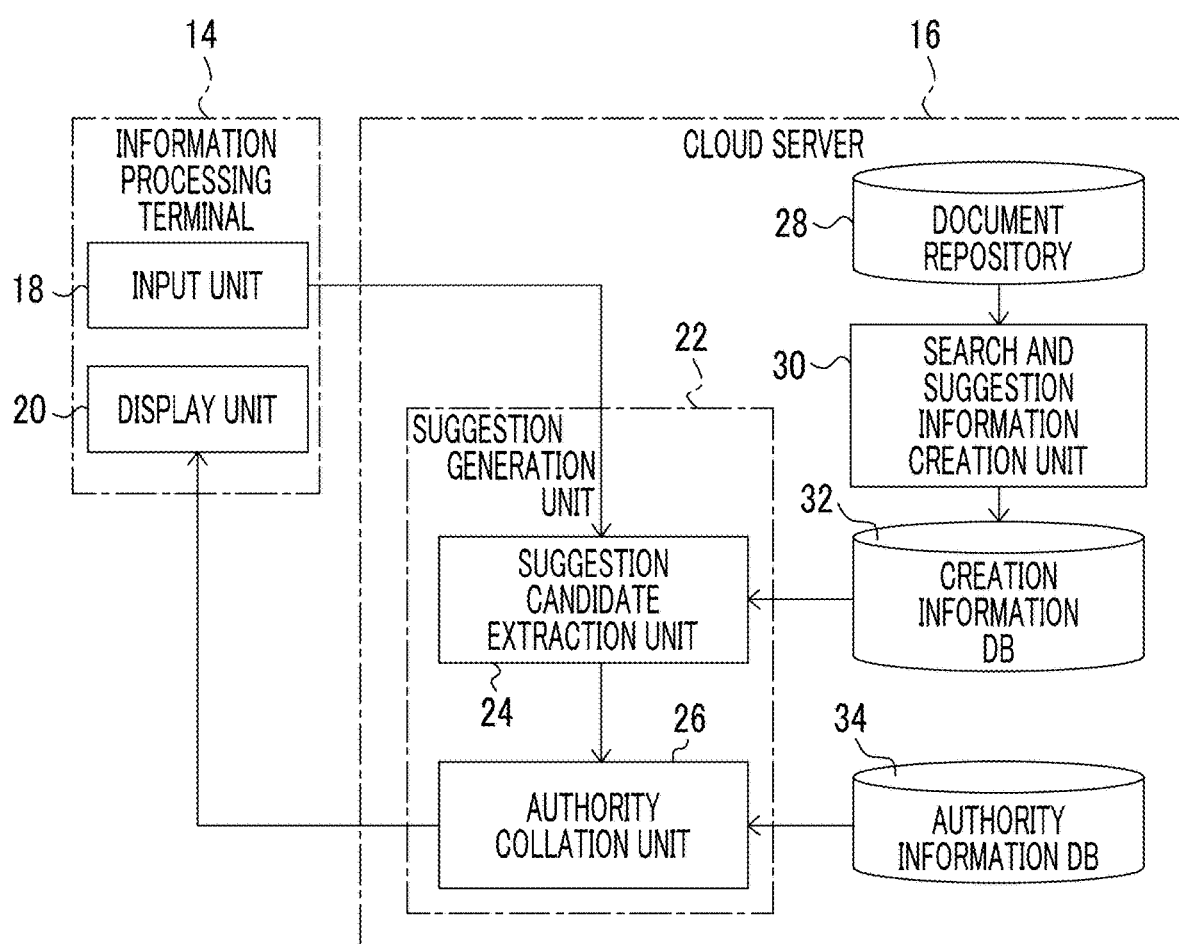
FIG. 3 is a functional block diagram of the information processing terminal and the cloud server in the information processing system according to the embodiment.

Subsequently, functional configurations of each of the information processing terminal 14 and the cloud server 16 in the information processing system 10 according to the embodiment configured as described above will be described. FIG. 3 is a functional block diagram of the information processing terminal 14 and the cloud server 16 in the information processing system 10 according to the embodiment.

In the embodiment, in a case in which the information processing terminal 14 searches document information stored in the document management service, when a text is input, the cloud server 16 has a function of presenting suggestion information corresponding to the text or a text string being input to the information processing terminal 14 to support a search.

The information processing terminal 14 generally has the functions of an input unit 18 and a display unit 20, in which the input unit 18 inputs texts and text strings using a keyboard or the like, and the display unit 20 displays various information on the display 14F.

The cloud server 16 has functions of a suggestion generation unit 22 as an acquisition unit and an output unit, a document repository 28, a search and suggestion information creation unit 30, a creation information database (DB) 32, and an authority information database (DB) 34.

The document repository 28 stores document information to be managed by the document management service, which is created or transmitted by the information processing terminal 14 or the like.

When the document information is stored in the document repository 28, the search and suggestion information creation unit 30 creates search information for searching the document information from the document information. Alternatively, when the document information is changed, the search information is changed based on the changed document information. In addition, when the search information is created or changed, the suggestion information is created from the search information. The suggestion information is created or changed simultaneously with the creation or change of the search information. Here, by "simultaneously", it means that the suggestion information is also stored in the storage area at the same timing when the search information is stored in the storage area. However, there may be a slight time delay in the recording of suggestion information (for example, from a few seconds to a few minutes). The time delay is a boundary until the text is input when the text string is input.

For example, when document information such as text is stored, the search and suggestion information creation unit 30 extracts and creates or changes the first document content or the like from the content of the document represented by the document information. Alternatively, the search and suggestion information creation unit 30 extracts nouns and creates or changes the suggestion information by morphologically analyzing the search information, for example.

The creation information DB 32 stores the search information and the suggestion information created by the search and suggestion information creation unit 30.

The authority information DB 34 stores information on the access authority as an operation authority of the user who operates the information processing terminal 14, with respect to the document information. For example, an access authority predetermined for each user, an access authority predetermined for each group to which the user belongs, and the like are stored.

In addition, the suggestion generation unit 22 has functions of a suggestion candidate extraction unit 24 and an authority collation unit 26 and generates the suggestion information to be presented to the information processing terminal 14.

The suggestion candidate extraction unit 24 acquires an input text or text string when a text or text string is inputted from the input unit 18 of the information processing terminal 14. Then, the suggestion information corresponding to the acquired text or text string is extracted as suggestion candidates from the suggestion information stored in the creation information DB 32.

The authority collation unit 26 acquires information of the user (for example, identification information of the user or group information to which the user belongs, and the like) from the information processing terminal 14, and acquires information on the access authority stored in advance corresponding to the user from the authority information DB 34. Then, the suggestion candidates extracted by the suggestion candidate extraction unit 24 are filtered by the access authority, transmitted to the information processing terminal 14, and presented to the user. In addition, when presenting the suggestion information to the information processing terminal 14, the authority collation unit 26 outputs display information for displaying with a suggestion content predetermined for each access authority.

Here, creation of the suggestion information by the search and suggestion information creation unit 30 will be described by way of an example.

First, the case of searching a document from the content of the document will be described. In this case, as described above, when the document information of the text is stored in the document repository 28, the search and suggestion information creation unit 30 creates the first document content as the search information from the content of the document, for example. As an example, as shown in FIG. 4, when the first document content is "I am a cat. I do not have a name yet.", this document content is stored in the creation information DB 32 as the search information. Then, by morphologically analyzing the search information, nouns are extracted, suggestion information is created, and stored in the creation information DB 32. In the example shown in FIG. 4, document A is assigned as the document ID, and the search information is created as "I am a cat. I do not have a name yet.", the suggestion information is created as "I", "cat", and "name".

In addition, as for the created suggestion information, when extracting the suggestion candidates with preceding text matching or partial text matching, a plurality of candidates may be extracted. Therefore, for a preferential selecting as a suggestion candidate, for example, as shown in FIG. 5, weighting may be assigned using the appearance frequency of a word or the like. There is a general idea of term frequency-inverse document frequency (TF-IDF), and term frequency (TF) may be used as the weight, for example. In the example of FIG. 5, weight of 3 is assigned for "machine learning", weight of 2 is assigned for "machine type", and weight of 1 is assigned for "machine".

Next, the case of searching for a document by document name will be described. In this case, when the document information is stored in the document repository 28, the search and suggestion information creation unit 30 stores the document names as the search information in the creation information DB 32, and likewise, stores the document names as the suggestion information in the creation information DB 32. For example, FIG. 6 shows an example of creating one example of search information, suggestion information, and weight, when three documents with document ID of document A to document C are stored in the document repository 28. In the example of FIG. 6, "machine specification document.docx" is created as the search information and the suggestion information for the document A, and weight of 35 is assigned. In addition, "machine learning.pptx" is created as the search information and the suggestion information for the document B, and weight of 21 is assigned. Further, "machine management register 2018.xlsx" is created as the search information and the suggestion information for the document C, and weight of 37 is assigned. In addition, when regarding that the role of suggestion is to complement the document name, the main effects include, for example, the reduced time of text inputting and prevention of typographical errors. Therefore, in order to preferentially suggest long document names, which take time until texts are inputted and have a high possibility of typographical errors, FIG. 6 shows an example in which a weight is assigned based on the length of the document name.

When a suggestion for the input text is performed using the suggestion information created in this way, for example, as shown in FIG. 6, when "machine" is input in a search field 40, among the suggestion information with the preceding texts matching "machine", the one with the longer document name is presented preferentially. The example of FIG. 6 shows an example in which the suggestion candidates are presented in the order of "machine management register 2018.xlsx", "machine specification document.docx", and "machine learning.ppx".

Note that the method of creating the suggestion information may be changed according to the attribute or attribute search information used for the document search. For example, for the suggestion information of the attribute of the document name, the document name itself is created as suggestion information, and for the suggestion information of the attribute of description sentence, nouns extracted from a description sentence such as the contents of the document are created as suggestion information. Here, regarding the attribute, documents have various attributes. For example, there are the document name, document description, creator, creation date, update person, update date, content size (for example, file size), and the like. In addition, the user may be able to create a new attribute as a custom attribute. For example, a text string or a text string in which an upper limit value of the text string length may be set, a boolean value, a date and time, a number, at least one of a user or a group, and the like may be used as custom attribute.

Figure 7:
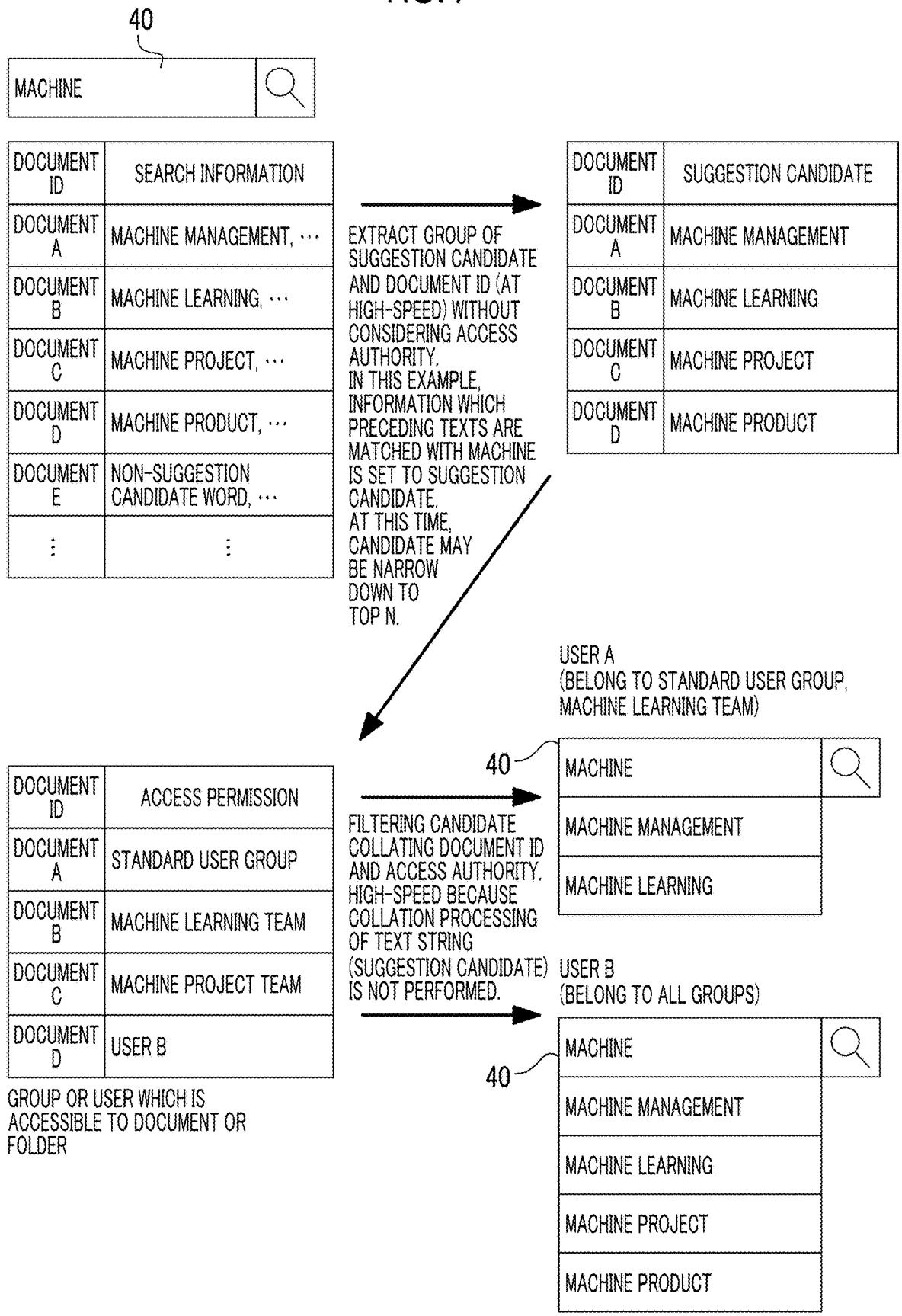
FIG. 7 is a diagram for describing an example of presenting suggestion candidates with preceding text matching according to access authority when "machine" is input in the search field.

Subsequently, a presentation method, when extracting suggestion candidates according to access authority and presenting it as suggestion information, will be described. FIG. 7 is a diagram for explaining an example of presenting suggestion candidates with preceding text matching according to access authority when "machine" is input in the search field 40.

As shown in FIG. 7, for example, when the user operates the information processing terminal and inputs "machine" in the search field 40, the suggestion candidates and the document ID are extracted from the suggestion information stored in the creation information DB 32, without considering the access authority. The example of FIG. 7 shows an example in which suggestion candidates having document IDs of documents A to E are extracted as suggestion candidate documents. FIG. 7 shows an example of extracting "machine management", "machine learning", "machine project", and "machine product" as the suggestion candidates.

In addition, when an accessible user or group is set for each document or folder, the document ID with the access authority are collated to filter the suggestion candidates. In the example of FIG. 7, it is assumed that permission to access "document A" is given to "standard user group", permission to access "document B" is given to "machine learning team", permission to access "document C" is given to "machine project Team", and permission to access "document D" is given to "user B". In a case in which the user A, who belongs to the standard user group and the machine learning team operates the information processing terminal 14 to input texts, when filtering the suggestion candidates by the access authority, "machine management" and "machine learning" are extracted and presented. Moreover, when the user B, who belongs to all the groups, operates the information processing terminal 14 to input texts, "machine management", "machine learning", "machine project", and "machine product" are extracted and presented.

Next, a first example of a presentation method, when presenting suggestion information by varying the suggestion method according to access authority will be described. FIG. 8 is a diagram for describing a first example of a presentation method, when presenting the suggestion information by varying the suggestion method according to access authority.

In FIG. 8, search information and suggestion information in which the document ID corresponds to the documents A to D are stored in the creation information DB 32. Specifically, for "document A", "machine management.xlsx" is respectively created as the search information and the suggestion information and 1 is assigned as the access authority ID. In addition, for "document B", "machine learning.pptx" is respectively created as the search information and the suggestion information and 1 is assigned as the access authority ID. In addition, for "document C", "machine project.docx" is respectively created as the search information and the suggestion information, and 2 is assigned as the access authority ID. In addition, for "document D", "machine document.xdw" is respectively created as the search information and the suggestion information and 2 is assigned as the access authority ID.

Further, contents corresponding to the access authority IDs 1 and 2, that is, the subject and the permitted operation are stored in the authority information DB 34. Specifically, when the access authority is 1, the user A is permitted to "read content", "write content", "display search", "write attribute" and "read attribute". When the access authority is 2, the user B is permitted to "display search" and "read attribute".

In FIG. 7 described above, the suggestion candidates are presented while excluding the suggestion candidates for which access authority is not available, but in the first example, the suggestion candidates are presented by varying the display mode as the suggestion method.

For example, when the user B inputs "machine" in the search field 40, instead of presenting only the suggestion candidates for which the access authority is available, as shown in FIG. 8, the display mode is changed and presented according to the suggestion candidates for which the access authority is available and the suggestion candidates for which access authority is not available, in different display mode by, for example, varying the color, displaying an icon, and the like. FIG. 8 shows an example in which the user B has the access authority to only "display search" and "read attribute", such that "machine management.xlsx" and "machine learning.pptx" for which access authority is available and "machine project.docx" and "machine document.xdw" for which access authority is not available are displayed in different colors by way of an example.

Next, a second example of a presentation method, when presenting suggestion information by varying the suggestion method according to access authority, will be described. FIG. 9 is a diagram for describing a second example of a presentation method, when presenting the suggestion information by varying the suggestion method according to access authority.

In FIG. 9, search information and suggestion information in which the document ID corresponds to the documents A to D are stored in the creation information DB 32. Specifically, for "document A", "machine management", and the like are respectively created as the search information and the suggestion information, and 1 is assigned as the access authority ID. In addition, for "document B", "machine learning", and the like are respectively created as the search information and the suggestion information and 1 is assigned as the access authority ID. In addition, for "document C", "machine project", and the like are respectively created as the search information and the suggestion information, and 2 is assigned as the access authority ID. In addition, for "document D", "machine document", and the like are respectively created as the search information and the suggestion information and 2 is assigned as the access authority ID.

Further, contents corresponding to the access authority IDs 1 and 2, that is, the subject and the permitted operation are stored in the authority information DB 34. Specifically, when the access authority is 1, the user A is permitted to "read content", "write content", and "transfer content". When the access authority is 2, the user B is permitted to "read content" and "write content".

In the first example, while the suggestion candidates are displayed as suggestion information in a display mode displaying the availability of access authority, in the second example, the suggestion candidates are displayed as suggestion information while the operation is not enabled depending on the access authority.

For example, when the user B inputs "machine" in the search field 40, instead of presenting only suggestion candidates for which access authority is available, as shown in FIG. 9, all suggestion candidates are presented, and the operation is not enabled. Specifically, as shown in FIG. 9, although all the suggestion candidates are displayed, the user B is not permitted to "transfer content", and thus the transfer operation is not enabled. Note that an icon or the like indicating that the transfer operation of content is not possible may be displayed as suggestion information together with the suggestion candidate.

Next, a third example of a presentation method in the case of presenting suggestion information by varying the suggestion method with the access authority will be described. FIG. 10 is a diagram for describing a third example of a presentation method when presenting the suggestion information by varying the suggestion method with an access authority.

In FIG. 10, as in the first example, search information and suggestion information in which the document ID corresponds to the documents A to D are stored in the creation information DB 32. Specifically, for "document A", "machine management.xlsx" is respectively created as the search information and the suggestion information and 1 is assigned as the access authority ID. In addition, for "document B", "machine learning.pptx" is respectively created as the search information and the suggestion information and 1 is assigned as the access authority ID. In addition, for "document C", "machine project.docx" is respectively created as the search information and the suggestion information, and 2 is assigned as the access authority ID. In addition, for "document D", "machine document.xdw", and the like are respectively created as the search information and the suggestion information and 2 is assigned as the access authority ID.

Further, contents corresponding to the access authority IDs 1 and 2, that is, the subject and the permitted operation are stored in the authority information DB 34. Specifically, when the access authority is 1, the user A is permitted to "read content", "write content", and "print content". When the access authority is 2, the user B is permitted to "read content" and "write content".

In the first example, the suggestion candidates are displayed in the display mode depending on the availability of the access authority, but in the third example, in addition to the change of the color of the suggestion candidates according to access authority in the first example, the icon is further displayed.

For example, when the user B may display the document content on the display 14F but may not print the same, an icon indicating that printing is impossible is displayed together with the suggestion candidates. Specifically, when the user B inputs "machine" in the search field 40, as in the first example of the presentation method, as shown in the first example of the presentation method of FIG. 8, a color is varied and presented according to the suggestion candidates for which the access authority is available and the suggestion candidates for which access authority is not available. Further, since printing of the content is not allowed for the user B, as shown in FIG. 10, an icon 42 indicating that printing of the content is not possible is displayed.

Note that the display method may be changed among the first to third examples of the presentation method and applied according to the type of the information processing terminal of a search requester (for example, a personal computer, a smartphone, an image forming apparatus, and the like).

Further, the permitted operations of the first to third examples of the presentation method shown in FIGS. 8 to 10 are merely examples, and may be other operations. Examples include read attribute, write attribute, read content, write content, print content, transfer content, delete folder or document, change folder or document access authority, acquire folder or document operation history, change lock folder or document, revise folder or document, delete folder or document revision history, create subordinate folder or document, delete subordinate folder or document, display search, and the like.

The suggestion method may be set using the screen shown in FIG. 11. FIG. 11 is a diagram showing an example of a setting screen of the suggestion method. For example, presenting the suggestion information is applied by default, and others are applied when set. Since the number of combinations of permission and non-permission of each operation may be enormous, as shown in FIG. 11, "Any", which may be either permission or non-permission, may be settable. In addition, the system supports making the conditions of the access authority for applying each of the suggestion methods mutually exclusive, by giving a warning, or the like.

Even when the suggestion method is changed and displayed according to access authority as in the first to third examples, the operation is not permitted when the access authority is not available. Therefore, when there is no access authority, a request for granting the access authority may be possible.

In the following, an example of a method of requesting the grant of access authority, when there are displayed suggestion candidates for which access authority is not available, will be described.

For example, as shown in FIG. 12, when the user B inputs "machine" and the suggestion candidates for which the access authority is available and the suggestion candidates for which the access authority is not available are displayed in different colors, the property display dialog may be displayed from the search result screen. Then, the example of FIG. 12 shows an example when there is no read content authority, and it is enabled to transmit an e-mail for requesting the creator to grant the access authority by operating a "request for granting the read content authority" button 44 on the dialog. As shown in FIG. 13, in the request for granting the access authority, a "request for granting an authority" button 46 for requesting the grant of authority may be displayed together with the display of the suggestion candidate, so that the request may be transmitted to the document creator or the like.

FIG. 14 is a diagram showing an example of the content of an e-mail sent to a document creator or the like when a request for granting is operated. FIG. 14 shows an example of the content of an e-mail for requesting the grant of the read content authority to "machine project.docx" from user A. In this example, an example is shown in which, when granting access authority or rejecting a request access, the designated uniform resource locator (URL) is accessed.

Figure 15:
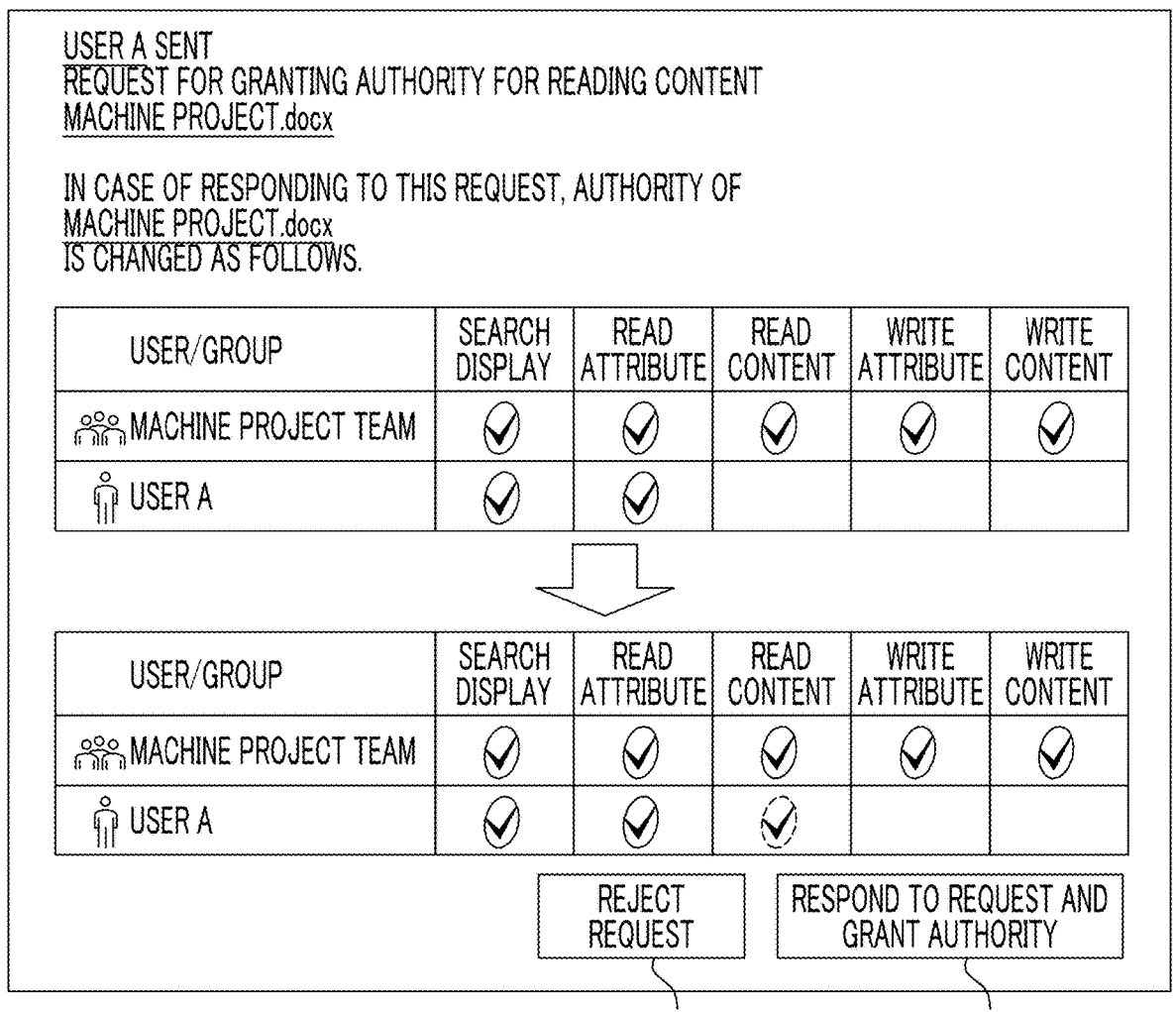
FIG. 15 shows an example of a screen for granting or rejecting access authority when accessing designated URL.

FIG. 15 shows an example of a screen for granting or rejecting the access authority when the designated URL is accessed. The example of FIG. 15 shows an example of a screen when a request for granting the read content authority indicated by a dotted line is performed. When rejecting the request, the "reject request" button 48 is operated, and when granting the access authority corresponding to the request, the "grant authority in response to request" button 50 is operated.

Subsequently, a specific processing example performed by each part of the information processing system 10 according to the embodiment configured as described above will be described.

First, specific processing when the cloud server 16 creates the suggestion information will be described.

Figure 16:
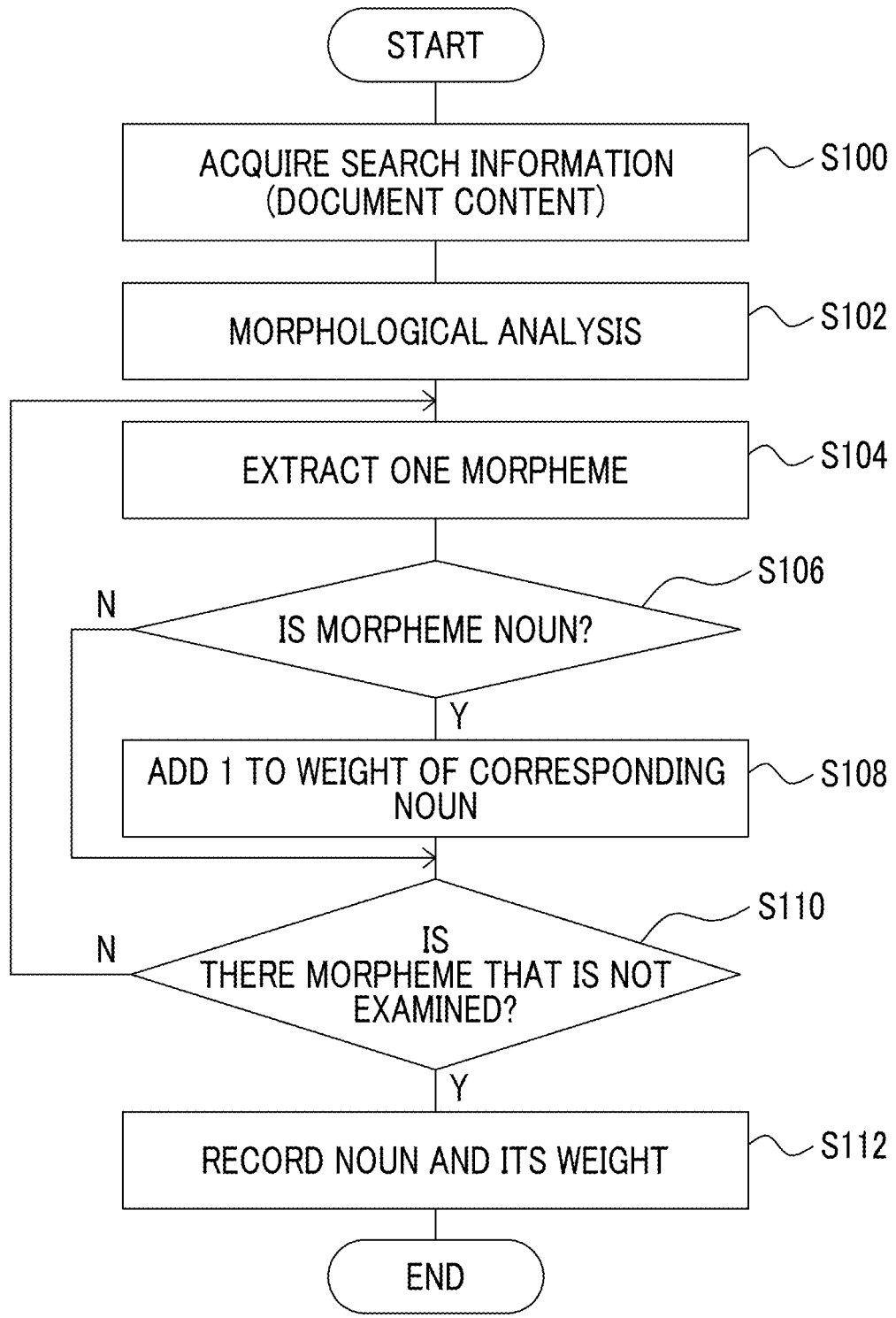
FIG. 16 is a flow chart showing an example of a flow of processing when the cloud server of the information processing system according to the embodiment extracts nouns and creates the suggestion information.

FIG. 16 is a flow chart showing an example of the flow of processing when the cloud server 16 of the information processing system 10 according to the embodiment extracts nouns and creates suggestion information. The processing in FIG. 16 starts, for example, when document information is stored in the document repository 28 and search information is created or changed.

In step S100, the search and suggestion information creation unit 30 acquires search information from the creation information DB 32 and proceeds to step S102. Note that instead of the search information, the document content of the document information stored in the document repository 28 may be acquired, and the following processing may be performed using the document content instead of the search information.

In step S102, the search and suggestion information creation unit 30 performs morphological analysis on the search information, and proceeds to step S104.

In step S104, the search and suggestion information creation unit 30 extracts one morpheme to be focused on, and proceeds to step S106.

In step S106, the search and suggestion information creation unit 30 determines whether or not the morpheme is a noun. When the determination is positive, the process proceeds to step S108, and when the determination is negative, the process proceeds to step S110.

In step S108, the search and suggestion information creation unit 30 adds 1 to the weight of the corresponding noun, and the process proceeds to step S110.

In step S110, the search and suggestion information creation unit 30 determines whether or not there is a morpheme that is not examined. When the determination is negative, the process returns to step S104 to perform the above processing with respect to other morphemes not checked, and when the determination is positive, the process proceeds to step S112.

In step S112, the search and suggestion information creation unit 30 records the noun and its weight in the creation information DB 32, and the series of processing is terminated. The weighting is performed using the appearance frequency in the document, as described above.

Figure 17:
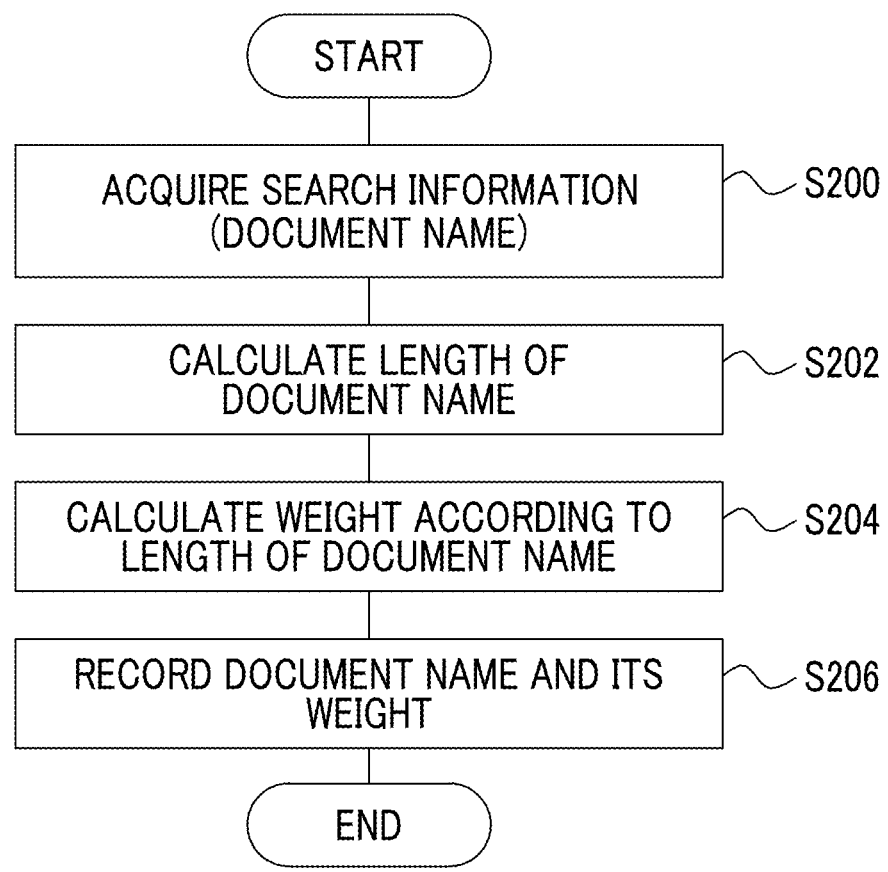
FIG. 17 is a flow chart showing an example of a flow of processing when the cloud server of the information processing system according to the embodiment extracts a document name and creates the suggestion information.

FIG. 17 is a flowchart showing an example of the flow of processing when the cloud server 16 of the information processing system 10 according to the embodiment extracts a document name and creates suggestion information. The processing of FIG. 17 starts, for example, when document information is stored in the document repository 28 and search information is created or changed.

In step S200, the search and suggestion information creation unit 30 acquires search information from the creation information DB 32 and proceeds to step S202. Note that the document name of the document information stored in the document repository 28 may be acquired.

In step S202, the search and suggestion information creation unit 30 calculates the length of the document name, that is, the number of texts of the document name, and the process proceeds to step S204.

In step S204, the search and suggestion information creation unit 30 calculates a weight according to the length of the document name, and the process proceeds to step S206. For example, the number of texts calculated in step S202 is calculated as a weight.

In step S206, the search and suggestion information creation unit 30 records the document name and its weight in the creation information DB 32, and the series of processing is ended.

Next, a processing performed when suggestion candidates presented by the cloud server 16 are generated and presented as suggestion information will be described.

Figure 18:
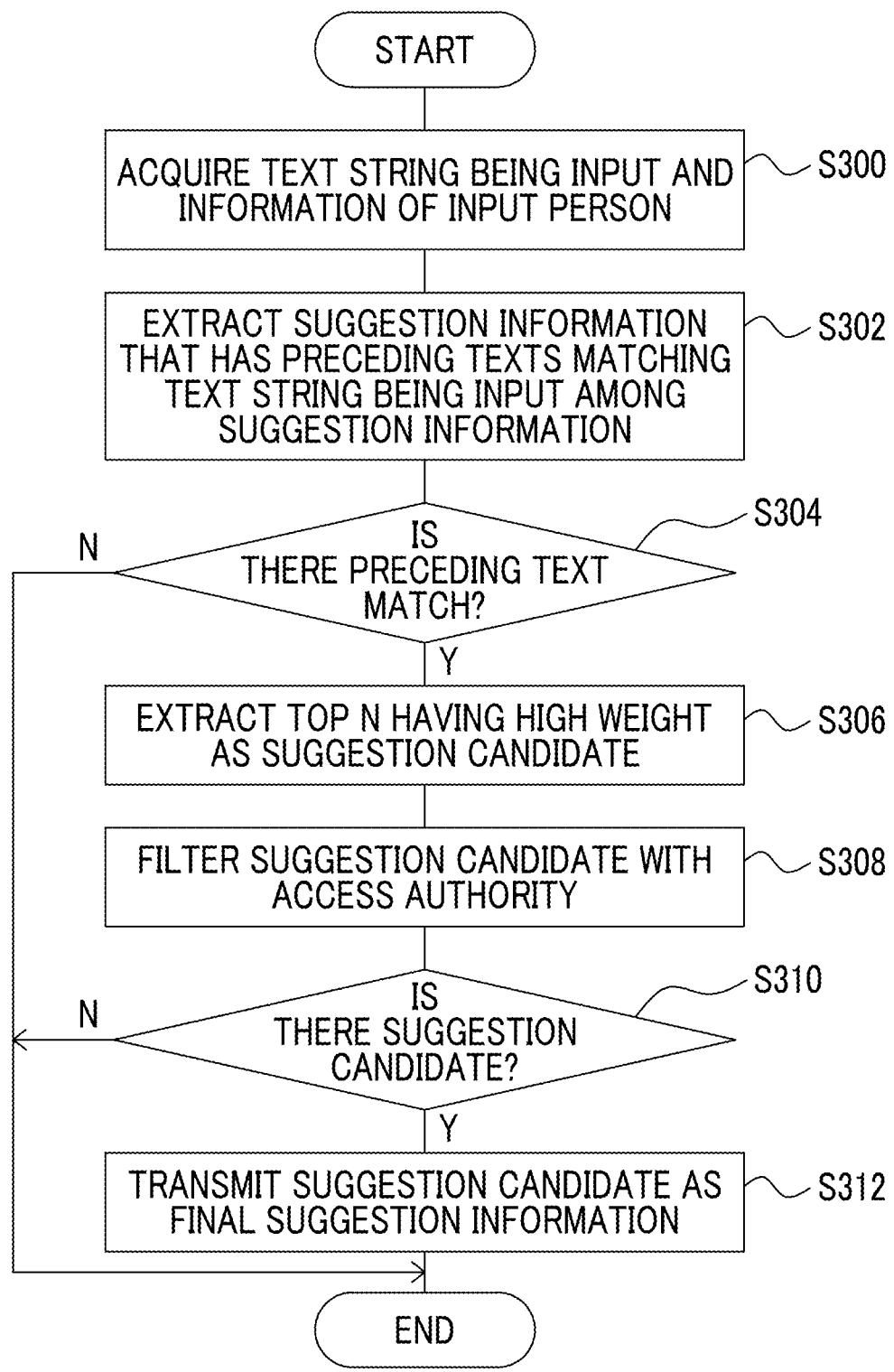
FIG. 18 is a flow chart showing an example of a flow of processing when the cloud server of the information processing system according to the embodiment extracts suggestion candidates according to the access authority and presents the result as the suggestion information.

First, a processing performed by the cloud server 16 when suggestion candidates according to access authority are extracted and presented as suggestion information will be described. FIG. 18 is a flowchart showing an example of the flow of processing when the cloud server 16 of the information processing system 10 according to the embodiment extracts suggestion candidates according to access authority and presents results as suggestion information. The processing of FIG. 18 starts when the information processing terminal 14 is operated and a text is input to the search field 40.

In step S300, the suggestion candidate extraction unit 24 acquires a text string including the text being input in the search field 40 and information of the input person from the input unit 18 of the information processing terminal 14, and the process proceeds to step S302. That is, a text string for searching for a suggestion candidate, a user ID of an input person, group information, and the like are acquired.

In step S302, the suggestion candidate extraction unit 24 extracts, from among the suggestion information stored in the creation information DB 32, the suggestion information that has preceding texts matching the text string being input, and the process proceeds to step S304.

In step S304, the suggestion candidate extraction unit 24 determines whether or not there is preceding text match. When the determination is negative, there is no suggestion candidate, so the series of processing is ended without presenting the suggestion information. When the determination is positive, the process proceeds to step S306.

In step S306, the suggestion candidate extraction unit 24 extracts the top N having high weight from the extracted suggestion information as suggestion candidates, and the process proceeds to step S308. N may be changed by a predetermined natural number.

In step S308, the authority collation unit 26 acquires information on the access authority of the input person from the authority information DB 34, and filters the suggestion candidates with the access authority, and the process proceeds to step S310.

In step S310, the authority collation unit 26 determines whether or not there is suggestion candidate as a result of filtering with the access authority. When the determination is negative, the series of processing is ended without presenting the suggestion information. When the determination is positive, the process proceeds to step S312.

In step S312, the authority collation unit 26 transmits the suggestion candidates remained after filtering with the access authority as final suggestion information to the information processing terminal 14, and the series of processing is ended. As a result, in the information processing terminal 14, the suggestion information corresponding to the text string being input is displayed on the display 14F by the display unit 20. The suggestion information to be transmitted to the information processing terminal 14 may be transmitted as information indicating the suggestion candidates as the display information, or may be transmitted as the display information including a display screen for displaying the suggestion candidate.

Figure 19:
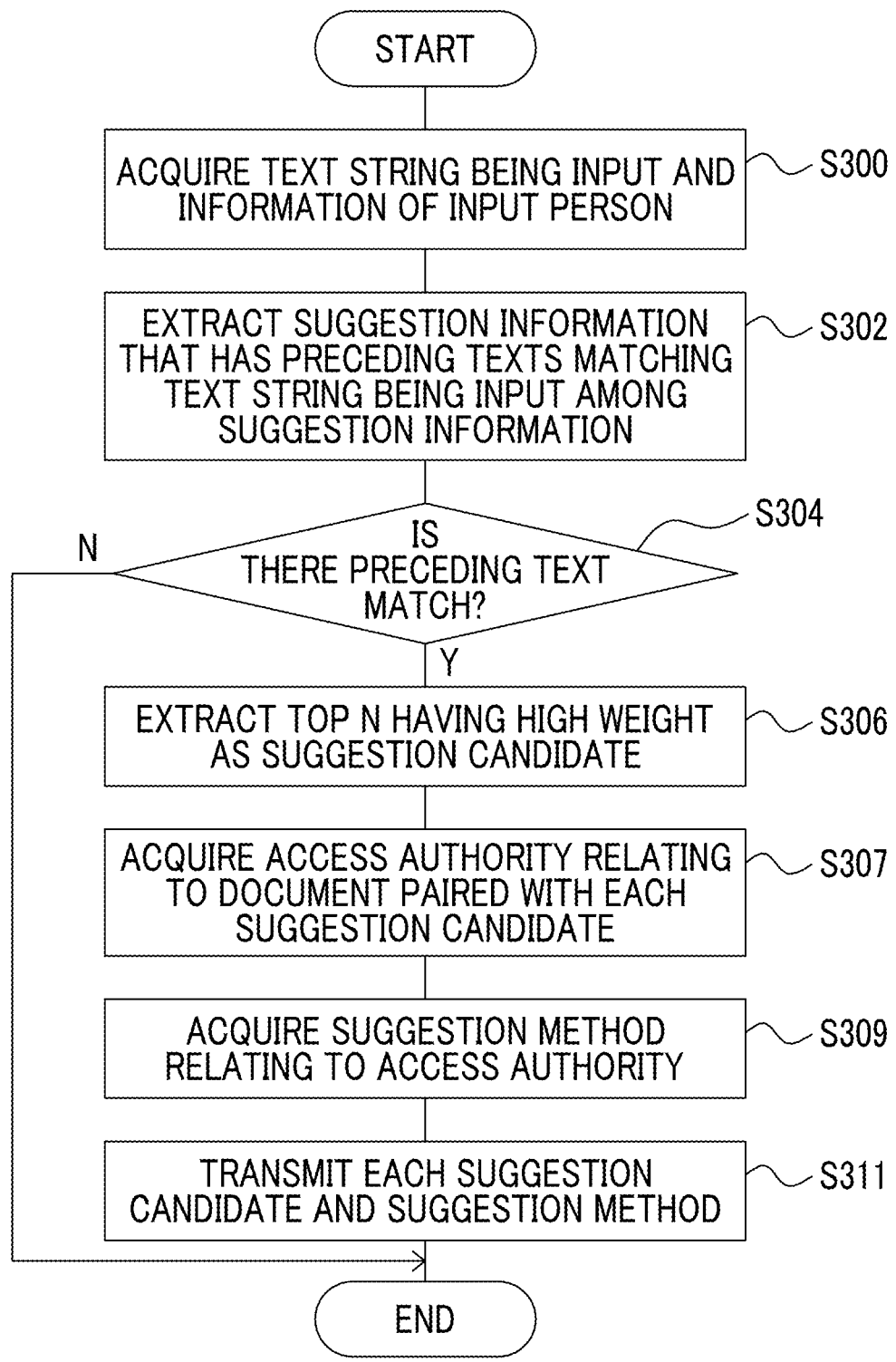
FIG. 19 is a flowchart showing an example of a flow of processing when the cloud server of the information processing system according to the embodiment changes the suggestion method according to access authority and presents the suggestion information.

Next, a processing performed by the cloud server 16 when presenting suggestion information by varying the suggestion method with the access authority will be described. FIG. 19 is a flow chart showing an example of the flow of processing when the cloud server 16 of the information processing system 10 according to the embodiment varies the suggestion method according to the access authority and presents the suggestion information. The processing of FIG. 19 starts when the information processing terminal 14 is operated and a text is input to the search field 40. The same processing as in FIG. 18 will be described with the same reference numerals.

In step S300, the suggestion candidate extraction unit 24 acquires a text string including the text being input in the search field 40 and information of the input person from the input unit 18 of the information processing terminal 14, and the process proceeds to step S302. That is, a text string for searching for a suggestion candidate, a user ID of an input person, group information, and the like are acquired.

In step S302, the suggestion candidate extraction unit 24 extracts, from among the suggestion information stored in the creation information DB 32, the suggestion information that has preceding texts matching the text string being input, and the process proceeds to step S304.

In step S304, the suggestion candidate extraction unit 24 determines whether or not there is preceding text match. When the determination is negative, there is no suggestion candidate, so the series of processing is ended without presenting the suggestion information. When the determination is positive, the process proceeds to step S306.

In step S306, the suggestion candidate extraction unit 24 extracts the top N having high weight from the extracted suggestion information as suggestion candidates, and the process proceeds to step S307. N may be changed by a predetermined natural number.

In step S307, the authority collation unit 26 acquires the access authority relating to the document paired with each suggestion candidate, and the process proceeds to step S309. That is, as shown in FIGS. 8 to 10, the content of the operation permitted from the access authority ID corresponding to the document paired with the suggestion candidates and information of the input person (for example, user ID, group information, and the like) are acquired.

In step S309, the authority collation unit 26 acquires the suggestion method relating to the access authority, and the process proceeds to step S311. For example, the suggestion method set on the setting screen of FIG. 11 is acquired.

In step S311, the authority collation unit 26 transmits each suggestion candidate and the suggestion method as suggestion information to the information processing terminal 14, and the series of processing is ended. Thereby, in the information processing terminal 14, the suggestion information corresponding to the text string being input is displayed on the display 14F by the display unit 20 by the suggestion method according to access authority. For example, on the information processing terminal, the suggestion information is displayed by the suggestion method described with reference to FIGS. 7 to 10. The suggestion information to be transmitted to the information processing terminal 14 may be transmitted as information indicating the suggestion candidates and the suggestion method as the display information, or may be transmitted as the display information including a display screen for displaying the suggestion candidate.

By performing the processing as described above, in the information processing system 10 according to the embodiment, the suggestion information for complementing the text input by inputting the text for searching is displayed with the suggestion content according to the user's access authority.

Figure 20:
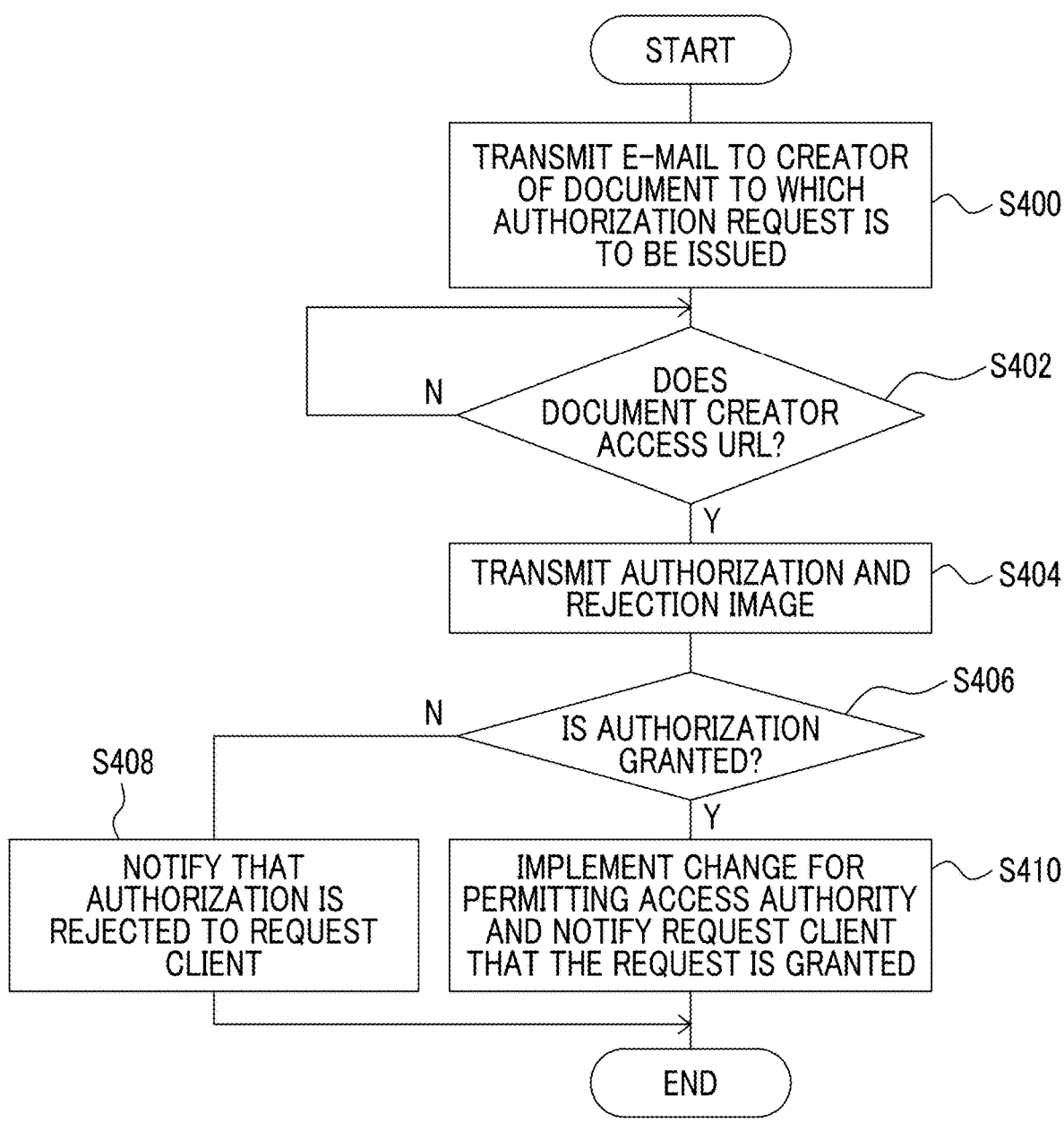
FIG. 20 is a flow chart showing an example of a flow of processing when the cloud server of the information processing system according to the embodiment receives a request for granting an authority from the information processing terminal.

Subsequently, when the suggestion information is presented to the information processing terminal 14 and there is no access authority, a processing is performed by the cloud server 16 when a request for grant the authority is issued to the cloud server 16 from the information processing terminal 14 will be described. FIG. 20 is a flowchart showing an example of the flow of processing when the cloud server 16 of the information processing system 10 according to the embodiment receives a request for granting an authority from the information processing terminal 14. The processing in FIG. 20 starts when a request for granting an authority is received from the information processing terminal 14.

In step S400, the CPU 16A transmits an e-mail to the creator of the document to which the request for granting an authority is to be issued, and proceeds to step S402. For example, the e-mail having the content shown in FIG. 14 described above is transmitted. The request may be transmitted to an administrator who manages the access authority, rather than the creator of the document. Step S400 corresponds to the transmitter.

In step S402, the CPU 16A determines whether or not the document creator accesses the URL sent by e-mail. After standing by until the determination is positive, the process proceeds to step S404.

In step S404, the CPU 16A transmits the authorization and rejection image to the information processing terminal 14 of the document creator who has accessed the URL, and the process proceeds to step S406. Thereby, a screen for granting or rejecting the access authority shown in FIG. 15 is displayed on the display 14F of the information processing terminal 14 of the document creator.

In step S406, the CPU 16A determines whether or not the authorization is granted. This determination determines whether or not the operation corresponding to the "grant authority in response to request" button 50 in FIG. 15 is performed, for example. When the determination is negative, that is, when the operation corresponding to the "reject request" button 48 in FIG. 15 is performed, the process proceeds to step S408, and when the determination is positive, the process proceeds to step S410. Step S406 corresponds to the receiver.

In step S408, the CPU 16A transmits information indicating that the authorization is rejected to the information processing terminal 14 of the request client, and the series of processing is ended.

On the other hand, in step S410, the CPU 16A implements the change for permitting the access authority, notifies the request client that the request is granted, and the series of processing is ended.

In the above embodiments, the case of searching the document stored in the document repository 28 from the information processing terminal 14 is described as an example, but not limited thereto. For example, the document stored in the document management service may be searched from an image forming apparatus or the like. In addition, the present invention may be applied to the case of searching for image information other than the suggestion document.

In addition, the processing performed by the cloud server 16 according to the above embodiment may be a processing performed by software, a processing performed by hardware, or a processing combining both. Further, the processing performed by the cloud server 16 may be stored as a program in a storage medium and distributed.

Further, the present invention is not limited to the above, and it goes without saying that the present invention may be variously modified and implemented without departing from the scope of the invention other than the above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a storage medium; and
a processor coupled to the storage medium and configured to:
acquire a text being input;
create or update search information and suggestion information, wherein
the search information is used for searching target information and generating the suggestion information and is created or updated based on the target information being updated,
the suggestion information is used as a display information and is created or updated based on the target information and the search information being updated; and
extract the suggestion information corresponding to the text and output the display information for displaying the extracted suggestion information with a suggestion content,
wherein the extracted suggestion information with the suggestion content is predetermined for a first operation authority and a second operation authority,
wherein the first operation authority represents a first permitted operation being performed on the target information and the second operation authority represents a second permitted operation different from the first permitted operation being performed on the target information,
the target information is used for generating the search information and comprises a document information being searched according to the text being input by the user, in which, the document information comprises a name or a content of a document, and
wherein the suggestion information has a weight for presenting preferentially.

2. The information processing apparatus according to claim 1 wherein the weight is prioritized according to a longer length of a document name to be searched.

3. The information processing apparatus according to claim 2,
wherein the processor is further configured to output the display information for displaying in a display mode that is predetermined for the first operation authority and the second operation authority.

4. The information processing apparatus according to claim 3,
wherein the display mode includes at least one of a display mode for displaying an image indicating that there is no operation authority or a display mode for displaying an image for requesting to grant the operation authority.

5. The information processing apparatus according to claim 4, further comprising:
a transmitter that, when a request for grant of an operation authority is performed, transmits request information for grant of the operation authority to an administrator terminal operated by an administrator of the target information; and
a receiver that transmits a predetermined screen for granting and rejecting the authority according to the request from the administrator terminal, and receives the grant or rejection of the authority.

6. The information processing apparatus according to claim 3, further comprising:
a transmitter that, when a request for grant of an operation authority is performed, transmits request information for grant of the operation authority to an administrator terminal operated by an administrator of the target information; and
a receiver that transmits a predetermined screen for granting and rejecting the authority according to the request from the administrator terminal, and receives the grant or rejection of the authority.

7. The information processing apparatus according to claim 2, further comprising:
a transmitter that, when a request for grant of an operation authority is performed, transmits request information for grant of the operation authority to an administrator terminal operated by an administrator of the target information; and
a receiver that transmits a predetermined screen for granting and rejecting the authority according to the request from the administrator terminal, and receives the grant or rejection of the authority.

8. The information processing apparatus according to claim 1,
wherein the processor is further configured to output the display information for displaying in a display mode that is predetermined for the first operation authority and the second operation authority.

9. The information processing apparatus according to claim 8,
wherein the display mode includes at least one of a display mode for displaying an image indicating that there is no operation authority or a display mode for displaying an image for requesting to grant the operation authority.

10. The information processing apparatus according to claim 9, further comprising:
a transmitter that, when a request for grant of an operation authority is performed, transmits request information for grant of the operation authority to an administrator terminal operated by an administrator of the target information; and
a receiver that transmits a predetermined screen for granting and rejecting the authority according to the request from the administrator terminal, and receives the grant or rejection of the authority.

11. The information processing apparatus according to claim 8, further comprising:
   a transmitter that, when a request for grant of an operation authority is performed, transmits request information for grant of the operation authority to an administrator terminal operated by an administrator of the target information; and
   a receiver that transmits a predetermined screen for granting and rejecting the authority according to the request from the administrator terminal, and receives the grant or rejection of the authority.

12. The information processing apparatus according to claim 1,
   wherein the processor is further configured to output the display information for displaying in a display mode that is predetermined for the first operation authority and the second operation authority.

13. The information processing apparatus according to claim 12,
   wherein the display mode includes at least one of a display mode for displaying an image indicating that there is no operation authority or a display mode for displaying an image for requesting to grant the operation authority.

14. The information processing apparatus according to claim 13, further comprising:
   a transmitter that, when a request for grant of an operation authority is performed, transmits request information for grant of the operation authority to an administrator terminal operated by an administrator of the target information; and
   a receiver that transmits a predetermined screen for granting and rejecting the authority according to the request from the administrator terminal, and receives the grant or rejection of the authority.

15. The information processing apparatus according to claim 12, further comprising:
   a transmitter that, when a request for grant of an operation authority is performed, transmits request information for grant of the operation authority to an administrator terminal operated by an administrator of the target information; and
   a receiver that transmits a predetermined screen for granting and rejecting the authority according to the request from the administrator terminal, and receives the grant or rejection of the authority.

16. The information processing apparatus according to claim 1, further comprising:
   a transmitter that, when a request for grant of an operation authority is performed, transmits request information for grant of the operation authority to an administrator terminal operated by an administrator of the target information; and
   a receiver that transmits a predetermined screen for granting and rejecting the authority according to the request from the administrator terminal, and receives the grant or rejection of the authority.

17. The information processing apparatus according to claim 1 further comprising:
   a transmitter that, when a request for grant of an operation authority is performed, transmits request information for grant of the operation authority to an administrator terminal operated by an administrator of the target information; and
   a receiver that transmits a predetermined screen for granting and rejecting the authority according to the request from the administrator terminal, and receives the grant or rejection of the authority.

18. The information processing apparatus according to claim 1,
   wherein the first permitted operation and the second permitted operation respectively comprises at least one of reading the content of the document, writing the content of the document, reading attribute of the document, writing attribute of the document, printing content, transferring content, deleting folder or document, changing folder or document access authority, acquiring folder or document operation history, changing lock folder or document, revising folder or document, deleting folder or document revision history, creating subordinate folder or document, and deleting subordinate folder or document.

19. A non-transitory computer readable medium storing information processing program for causing a computer comprising a storage medium and a processor to execute functions comprising:
   acquiring a text being input;
   creating or updating search information and suggestion information,
      wherein the search information is used for searching target information and generating the suggestion information and is created or updated based on the target information being updated, the suggestion information is used as a display information and is created or updated based on the target information and the search information being updated; and
   extracting the suggestion information corresponding to the text and outputting the display information for displaying the extracted suggestion information with a suggestion content,
   wherein the extracted suggestion information with the suggestion content is predetermined for a first operation authority and a second operation authority,
   wherein the first operation authority represents a first permitted operation being performed on the target information and the second operation authority represents a second permitted operation different from the first permitted operation being performed on the target information,
   the target information is used for generating the search information and comprises a document information being searched according to the text being input by the user, in which, the document information comprises a name or a content of a document, and
   wherein the suggestion information has a weight for presenting preferentially.

20. A method used by an information processing apparatus for presenting a suggestion information comprising:
   acquiring a text being input;
   creating or updating search information and suggestion information,
   wherein
   the search information is used for searching target information and generating the suggestion information and is created or updated based on the target information being updated, the suggestion information is used as a display information and is created or updated based on the target information and the search information being updated; and extracting the suggestion information corresponding to the text and outputting the display information for displaying the extracted suggestion information with a suggestion content, wherein the extracted suggestion information with the suggestion content is predetermined for a first operation authority and a second operation authority, wherein the first operation authority represents a first permitted operation being performed on the target information and the second operation authority represents a second permitted operation different from the first permitted operation being performed on the target information, the target information is used for generating the search information and comprises a document information being searched according to the text being input by the user, in which, the document information comprises a name or a content of a document, and wherein the suggestion information has a weight for presenting preferentially.

\* \* \* \* \*